United States Patent [19]
Johnson

[11] Patent Number: 6,012,011
[45] Date of Patent: Jan. 4, 2000

[54] TRACTION CONTROL SYSTEM AND A METHOD FOR REMEDYING WHEEL-SLIPPAGE

[76] Inventor: Chipley H. Johnson, 800 Camp Yonah Rd., Clarkesville, Ga. 30523

[21] Appl. No.: 08/927,175

[22] Filed: Sep. 11, 1997

[51] Int. Cl.[7] .................................................. B61C 15/12
[52] U.S. Cl. ................................. 701/82; 701/90; 701/20; 180/197
[58] Field of Search ................................. 701/82, 19, 20, 701/90; 180/197; 303/133, 142; 318/52

[56] References Cited

U.S. PATENT DOCUMENTS

| | | | |
|---|---|---|---|
| 3,764,867 | 10/1973 | Smith | 318/52 |
| 4,633,147 | 12/1986 | Posma et al. | 318/52 |
| 4,896,090 | 1/1990 | Balch et al. | 318/52 |
| 4,924,395 | 5/1990 | Evans et al. | 701/71 |
| 4,950,964 | 8/1990 | Evans | 318/52 |
| 5,289,093 | 2/1994 | Jobard | 318/434 |
| 5,436,538 | 7/1995 | Garvey et al. | 318/52 |
| 5,610,819 | 3/1997 | Mann et al. | 701/20 |

*Primary Examiner*—Michael J. Zanelli
*Attorney, Agent, or Firm*—Troutman Sanders LLP; Gregory Scott Smith, Esq.; Wm. Brook Lafferty, Esq.

[57] ABSTRACT

A system and a method for remedying wheel-slippage while maintaining maximum acceleration power. The present invention monitors the speed of each of the traction motors used to drive the wheels, gears, or pulleys of a device such as the wheels of a locomotive (210) is monitored. If the speed of a particular traction motor exceeds the speed of the other traction motors by a percentage, the wheels that are driven by that particular traction motor are considered to be slipping (220). This is referred to as wheel-slippage. The wheel-slippage is remedied by briefly interrupting the supply of power to that particular traction motor (230, 240). This technique allows wheel-slippage to be corrected without reducing the motive power applied to non-slipping wheels, thereby maintaining maximum acceleration power.

16 Claims, 3 Drawing Sheets

TRACTION CONTROL SYSTEM AND A METHOD FOR REMEDYING WHEEL-SLIPPAGE

TECHNICAL FIELD

The present invention relates to traction control systems and, more particularly, relates to a system and method for detecting and remedying wheel-slippage.

BACKGROUND OF THE INVENTION

Diesel-electric railroad locomotives with series-wound, direct current (DC) traction motors replaced steam powered locomotives in the 1940's and have been the conventional motive power in America ever since. These railroad locomotives typically have either four or six axles with each axle having one traction motor and two wheels.

Such a railroad locomotive is set into motion by applying power to each of the series-wound, DC traction motors. Upon the application of power, torque develops in each of the series wound DC traction motors. This torque is then applied to the wheels of the axle. When enough torque has been developed, the wheels of the railroad locomotive are forced to turn, thereby moving the locomotive. The series wound DC traction motors are able to develop torque throughout their full speed range from stall to full speed.

A problem that can occur during acceleration of a railroad locomotive is wheel-slippage. Wheel-slippage occurs when the amount of adhesion existing between the wheels of one axle of the railroad locomotive and the rail of the railroad track is insufficient for the amount of torque being applied to the wheels. Thus, the wheels begin to spin on the rail. When wheel-slippage occurs, the traction motors continue to develop torque. This results in increasing the amount of wheel-slippage. Ultimately, the traction between the wheels of the railroad locomotive and the rails of the railroad are greatly diminished. To correct this runaway condition, the wheel speed must be reduced to nearly the rack speed of the locomotive (or the speed that the wheels should be turning to maintain the current speed of the locomotive). A problem that exists with railroad locomotives is reducing the speed of the traction motor associated with the wheel-slippage without affecting the speed or power of the other traction motors. Thus, in current systems, a degradation in the power being applied to the locomotive is realized when remedying wheel-slippage.

Several techniques have been used in an attempt to control wheel-slippage on railroad locomotives. A common technique involves reducing the main generator output when wheel-slippage is detected on any axle. Reducing the output of the main generator results in decreasing the torque of each of the traction motors. Thus, the output of the main generator can be reduced until the wheel-slippage stops. Although this technique stops the wheel-slippage, it also reduces the amount of power applied to accelerate the locomotive. The torque of each of the traction motors is reduced even though only one of the traction motors may be associated with wheel-slippage. Thus, the maximum amount of power that can be delivered to all of the wheels of the locomotive is limited as a function of the least adhesive wheels.

Another technique used to control wheel-slippage involves applying an abrader, such as sand, between the wheels of the locomotive and the rail to increase adhesion. The application of the abrader inhibits wheel-slippage from occurring. But, once wheel-slippage has started, the abrader is ineffective to stop the wheel-slippage.

Another technique used to control wheel-slippage involves the application of friction brakes on the wheels that are slipping. The friction brakes can be used to slow the wheels to the rack speed of the train, and hence, to stop the wheels from slipping. A problem with this technique exists because typical friction brakes are not designed to operate on one axle independently of the others. Thus, to stop wheel-slippage, the friction brakes are applied to all of the wheels of the locomotive thereby reducing the acceleration power. In addition, typical friction brake controls are not very accurate. Thus, applying the friction brakes can result in one of two extreme conditions. First, if the friction brakes are not strong enough, the wheels may continue to slip after the application of the friction breaks. Secondly, if the friction brakes are too strong, the wheels may begin to slide on the rail.

Another technique used to control wheel-slippage is based on the configuration of the railroad locomotive. Generally, a locomotive or locomotive consist, includes several locomotive units located at the front of a line of rail cars. The locomotive unit located at the very front is more susceptible to wheel-slippage than the other locomotive units. Thus, when wheel-slippage is detected, the wheel-slippage can be cured by reducing the power of only the lead locomotive unit. This method of reducing wheel-slippage is insufficient for at least two reasons. First, when the locomotive only consists of a single locomotive unit, this method is inapplicable. Second, this method is crude and does not take into account other factors such as the wear of the wheels of other locomotive units, output power of the other locomotive units, etc.

SUMMARY OF THE INVENTION

The present invention provides a traction control system and a method for detecting and remedying wheel-slippage while maintaining maximum acceleration. The present invention monitors the speed of each of the traction motors used to drive the wheels, gears, or pulleys of a device such as the wheels of a locomotive. If the speed of a particular traction motor indicates that the wheels that are driven by that particular traction motor are slipping, power is removed only from that particular traction motor. Advantageously, this allows the traction control system to maintain the maximum acceleration power possible and while remedying the wheel-slippage.

More specifically, the traction control system limits wheel-slippage induced by traction motors embedded within a locomotive. In this embodiment, each of the traction motors are independently coupled to and drive at least one wheel. A control system selectively provides a power signal to each of the traction motors. A monitoring system determines the speed of each of the traction motors and establishes a threshold speed. The monitoring system also detects when the speed of a particular traction motor exceeds a slipping speed which is indicative of wheel-slippage. The slipping speed is equated to the sum of the threshold speed and a percentage of the threshold speed. When wheel-slippage is detected, the monitoring system provides a wheel-slippage indicator to the controller. The controller remedies the wheel-slippage by inhibiting the power signal from being provided to the particular traction motor for a predetermined period of time.

In another embodiment, the control system remedies the wheel-slippage by inhibiting the power signal from being provided to the particular traction motor until the speed of the traction motor decreases within a predetermined range of the threshold speed.

The present invention also provides a method for remedying wheel-slippage induced by at least one of the traction motors of a device with each of the traction motors being independently coupled to and driving at least one wheel, pulley, gear etc. The operating speed of each of the traction motors is monitored. A threshold speed is established, based on the operating speed of at least one of the traction motors. Subsequently, the operating speed of each of the traction motors are compared to the threshold speed. If the operating speed of a traction motor exceeds the threshold speed by a percentage, power is inhibited from being provided to the traction motor. When the speed of the traction motor decreases to within a range of the threshold speed, power is then reapplied to the traction motor.

These and other aspects, features, and advantages of the present invention will be more clearly understood and appreciated from a review of the following detailed description of the present invention and possible embodiments thereof, and by reference to the appended drawings and claims.

DETAILED DESCRIPTION

The present invention is directed toward a system and a method for remedying wheel-slippage in the wheels, gears, or pulleys of a device, such as the wheels of a locomotive. In addition, the present invention is directed toward remedying wheel-slippage that may be induced by applying acceleration power to a motor, while limiting the reduction of the acceleration power. Generally described, the present invention monitors the speed of each of the traction motors. If the operating speed of a particular traction motor exceeds the speed of the other traction motors by a predetermined amount, the wheels, gears, or pulleys that are driven by that particular traction motor are considered to be slipping. This is referred to as wheel-slippage. The present invention allows each of the traction motors to be independently controlled. Thus, the wheel-slippage is remedied by briefly interrupting the supply of power to the traction motor causing the wheel-slippage. This technique allows wheel-slippage to be corrected without reducing the motive power applied to non-slipping wheels, thereby maintaining a high level of acceleration power.

Figure 1:
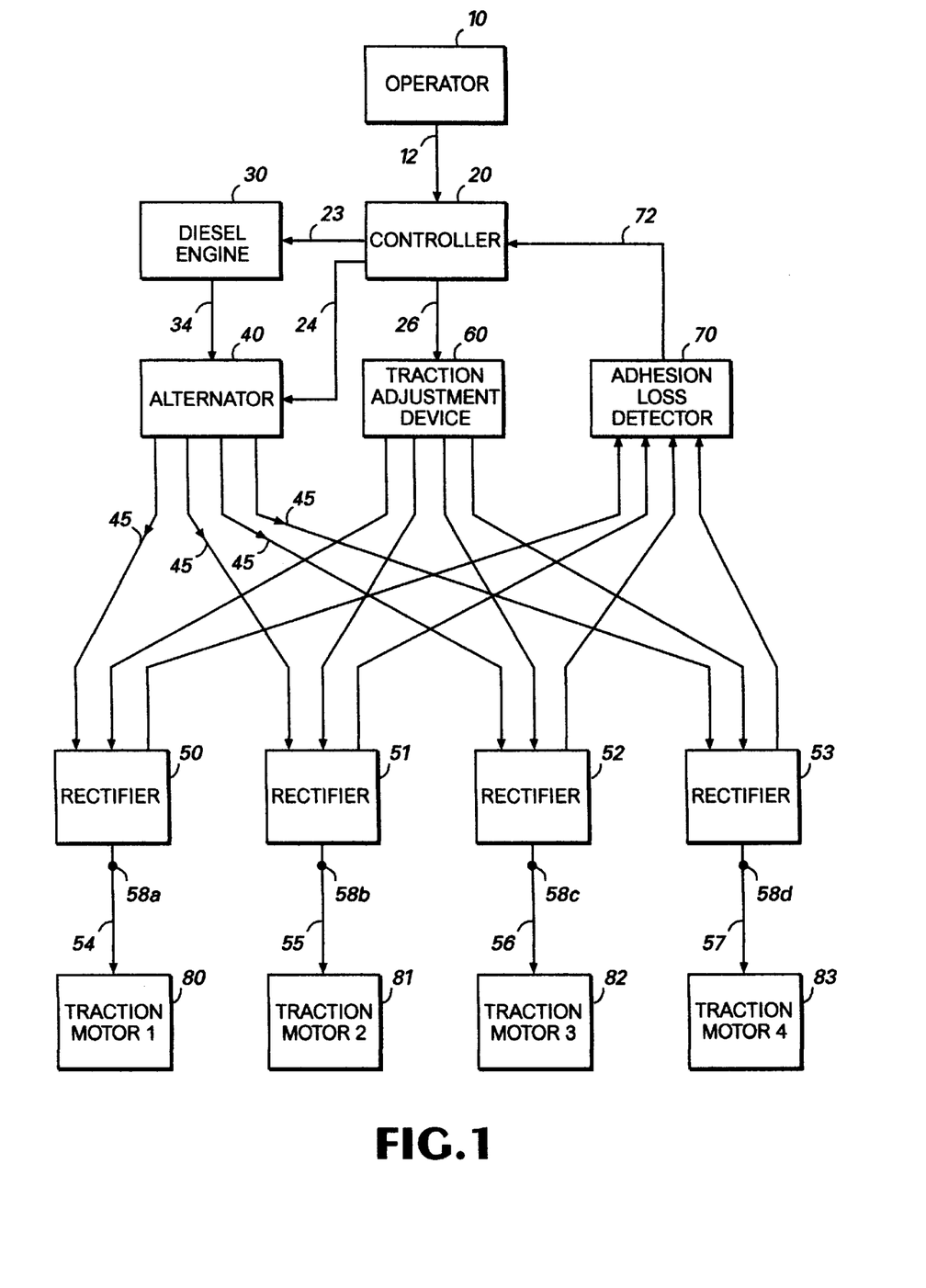
FIG. 1 is a block diagram illustrating an exemplary embodiment of the traction control system of the present invention embodied within a locomotive.

FIG. 1 is a block diagram illustrating an exemplary embodiment of the traction control system of the present invention embodied within a locomotive. Although the present invention is described as embodied within a railroad locomotive, the present invention can also be embedded in other applications such a subway trains, light rail systems, tracked vehicles such as tanks, and even machinery such as conveyor belts, escalators. etc. The exemplary traction control system of the present invention includes a controller and a monitoring system.

Controller

One aspect of the exemplary control system involves selectively providing a power signal to each of the traction motors of the locomotive. In the exemplary embodiment, the control system encompasses a controller 20, a traction adjustment device 60, and rectifier assemblies 50–53, but it could be otherwise configured so long it accomplishes the operations set forth below.

An operator 10 interfaces with the traction control system through a controller 20. The controller 20 generally includes a computer or microprocessor based device with various interfaces. One such interface, the operator interface 12, may include a control panel with indicators, switches, and other various controls. The operator 10 controls the speed of the traction motors by manipulating one or more of the switches or controls of the controller's 20 control panel. The controller 20 responds to the actions of the operator by: (a) providing a diesel control signal to a diesel engine 30 over interface 23; and (b) providing an excitor signal to an alternating-current generator ("alternator") 40 over interface 24. In essence, these two signals operate as a throttle to control the speed of the locomotive.

The diesel engine 30 is mechanically coupled to the alternator 40 over interface 34. When the throttle of the diesel engine 30 is opened (i.e., the diesel engine is turned on or placed in gear in response to receiving the diesel control signal), the diesel engine 30 drives or spins the coils of the alternator 40. In response to the excitor signal received from the controller 20 over interface 24, an electrical field or excitor field is created around the coils of the alternator 40. When the coils of the alternator 40 are spinning within the excitor field, an alternating-current signal 45 is generated. Increasing the intensity of the excitor field results in increasing the level of the alternating-current signal 45. Likewise, decreasing the intensity of the excitor field results in decreasing the level of the alternating-current signal 45.

The alternating-current signal 45 is used to drive the traction motors of the locomotive. However, in the exemplary embodiment, the traction motors are series-wound, direct-current ("DC") traction motors. It is anticipated that various other types of motors, such as polyphase induction motors, synchronous motors, single-phase induction motors, shaded-pole induction motors, reluctance motors, hysteresis motors, and alternating-current motors, also could be controlled by embodiments of the present invention, and the present invention is not only limited to series-wound, DC motors. In order to drive the DC traction motors, the alternating-current signal 45 must be converted into a power signal compatible with the DC traction motors (i.e., a DC signal). One technique to accomplish this conversion is by passing the alternating-current signal 45 through a rectifier.

In the exemplary embodiment of the traction control system, each traction motor of the locomotive is independently controlled by a dedicated rectifier assembly. FIG. 1 illustrates an embodiment in which each of four rectifier assemblies 50–53 receive the alternating-current signal 45 from the alternator 40 and provide a DC signal 58a–d respectively to four traction motors 80–83. The detailed operation of the rectifier assemblies are described in the discussion of FIG. 2 below. In general, each of the rectifiers 50–53 convert the alternating-current signal 45 into DC signals 58a–d and then pass each of these signals to one of the traction motors 80–83 over respective interfaces 54–57.

The traction motors 80–83 can be switched on or off through the rectifier assemblies 50–53 by allowing or inhibiting respectively the DC signals 58a–d to be provided to the traction motors 80–83. The traction adjustment device 60, selectively switches a particular traction motor on or off by controlling the rectifier assembly associated with the particular traction motor over interface 65. As an example, if the controller 20 determines that traction motor 80 should be turned off, the controller 20 sends a control signal to the traction adjustment device 60 over interface 26. In response to the reception of this control signal, the traction adjustment device 60 forces the rectifier assembly 50 to inhibit the DC signal 58a from being provided to traction motor 80. Thus, each of the traction motors can be independently switched on or off.

Embodied within a locomotive, each of the traction motors 80–83 is mechanically coupled to a set of wheels with each set of wheels sharing a single axle (not shown). As a DC signal passes through the series wound coils of the traction motors, torque is generated. When the torque generated by a particular traction motor reaches a sufficient level, the wheels driven by that particular traction motor are forced to turn on the axle. If the torque generated by a traction motor is excessive, the wheels driven by the traction motor may begin to slip.

When particular wheels of the locomotive are slipping, a wheel-slippage indicator is provided to the controller. The wheel-slippage indicator identifies which traction motor is driving the slipping wheels. In response to receiving the wheel-slippage indicator, the controller operates to remove the DC signal from the identified traction motor.

Monitoring System

The monitoring system is used to detect the occurrence of wheel-slippage and provide a wheel-slippage indicator. In the exemplary embodiment, the monitoring system encompasses an adhesion loss detector 70 and a controller 20, but it could be otherwise configured so long as it accomplishes the operations set forth below. In addition, if the monitoring system is configured as illustrated in FIG. 1, (i.e., the controller and the monitoring system share the same controller 20) the wheel-slippage indicator is inherent to the controller 20.

Generally described, the monitoring system is coupled to each of the traction motors and detects an increase in the speed of one of any one of the traction motors beyond a percentage of a threshold speed. If the speed of one traction motor is excessive in comparison to the speed of the other traction motors, it is likely that the wheels driven by that traction motor are slipping.

In operation, the rectifier assemblies 50–53 provide signals, representative of the speed of the respective traction motors 80–83, to an adhesion loss detector 70 having connectors 101 and 102. The adhesion loss detector 70 converts these signals into analog signals and provides them to the controller 20 over interface 72. The controller 20 examines the signals received from each of the rectifier assemblies 50–53 and identifies a threshold motor speed. In the exemplary embodiment, the threshold speed is set to the slowest speed at which any of the traction motors 80–83 are turning. In alternative embodiments, the threshold speed could be set to an average of the motor speeds, the average of the fastest and slowest motor speed, or some other variation. The present invention is not limited to any particular method for determining the threshold speed.

The threshold speed is used in the process of detecting wheel-slippage. If the speed of one of the traction motors 80–83 exceeds a slipping speed, it is assumed that the wheels being driven by the traction motor are slipping. In one embodiment, the slipping speed is the sum of a threshold speed and a percentage (referred to as the trigger-off percentage) of the threshold speed. The trigger-off percentage necessary to reliably identify wheel-slippage is dependent upon many factors and varies from locomotive to locomotive. Thus, the trigger-off percentage is typically derived empirically by testing each locomotive prior to placing the locomotive into service. Generally, the trigger-off percentage is about 25% of the threshold speed. However, it should be understood, that the present invention may be used in several different embodiments conforming with various design structures and using various materials. In some embodiments, a trigger-off condition may be based on the speed of a traction motor exceeding a simple threshold value. In other embodiments, a variable threshold value may be used to activate the trigger-off condition. Using a percentage of the threshold speed is one example of a variable threshold value. The present invention may be used in any of these embodiments and is not limited to any specific embodiment.

When the controller 20 detects that one or more of the traction motors is causing the wheels to slip, the controller 20 provides a signal to the traction adjustment device 60 over interface 26. In response to this signal, the traction adjustment device 60 inhibits the rectifier assemblies associated with these traction motors from providing the direct-current signal. The absence of the direct-current signal results in the traction motors decelerating. When the direct-current has been inhibited from a traction motor for a sufficient amount of time to remedy the wheel slippage, then the direct-current is again provided from the rectifier. In another embodiment, when the speed of the traction motor falls within a predetermined range of the threshold speed, the wheels-slippage is assumed to have been stopped, and the direct-current signal is again provided to the rectifier. In some embodiments, the predetermined range may be a simple range around the threshold speed. In other embodiments, the range may be a variable value based on the speed of the traction motors or other parameters. The present invention may be used in any of these embodiments and is not limited to any specific embodiment.

In the exemplary embodiment in which series wound DC motors are used, the operating speed of the traction motors is determined by monitoring the level of power demanded by the traction motor. As direct-current flows through the series wound coils of a traction motor, torque is created. When the level of the direct-current increases, the amount of torque also increases. If the traction motor is initially stopped (i.e., is not rotating a drive shaft), the torque of the traction motor can be increased to a level that results in forcing the traction motor to start (i.e., rotating the drive shaft). As the speed of the traction motor begins to increase, the level of torque decreases and, hence, the amount of direct-current required also decreases. Eventually, an equilibrium state is reached at which the torque, speed, voltage and current are essentially constant. To increase the speed of the traction motor, the direct-current and/or voltage can be increased. To decrease the speed of the traction motor, the direct-current and/or voltage can be decreased. In either case, the traction motor eventually reaches the equilibrium state. This relationship between the direct-current and voltage to the speed of a traction motor is used by the monitoring system in determining the speed of the traction motor.

The reader will understand that other methods for measuring the speed of the traction motors could also be used in conjunction with the present invention. These methods include but are not limited to the use of prony brakes, two-scale prony brakes, dynamometers, and optical sensors.

Exemplary Embodiment

Figure 2:
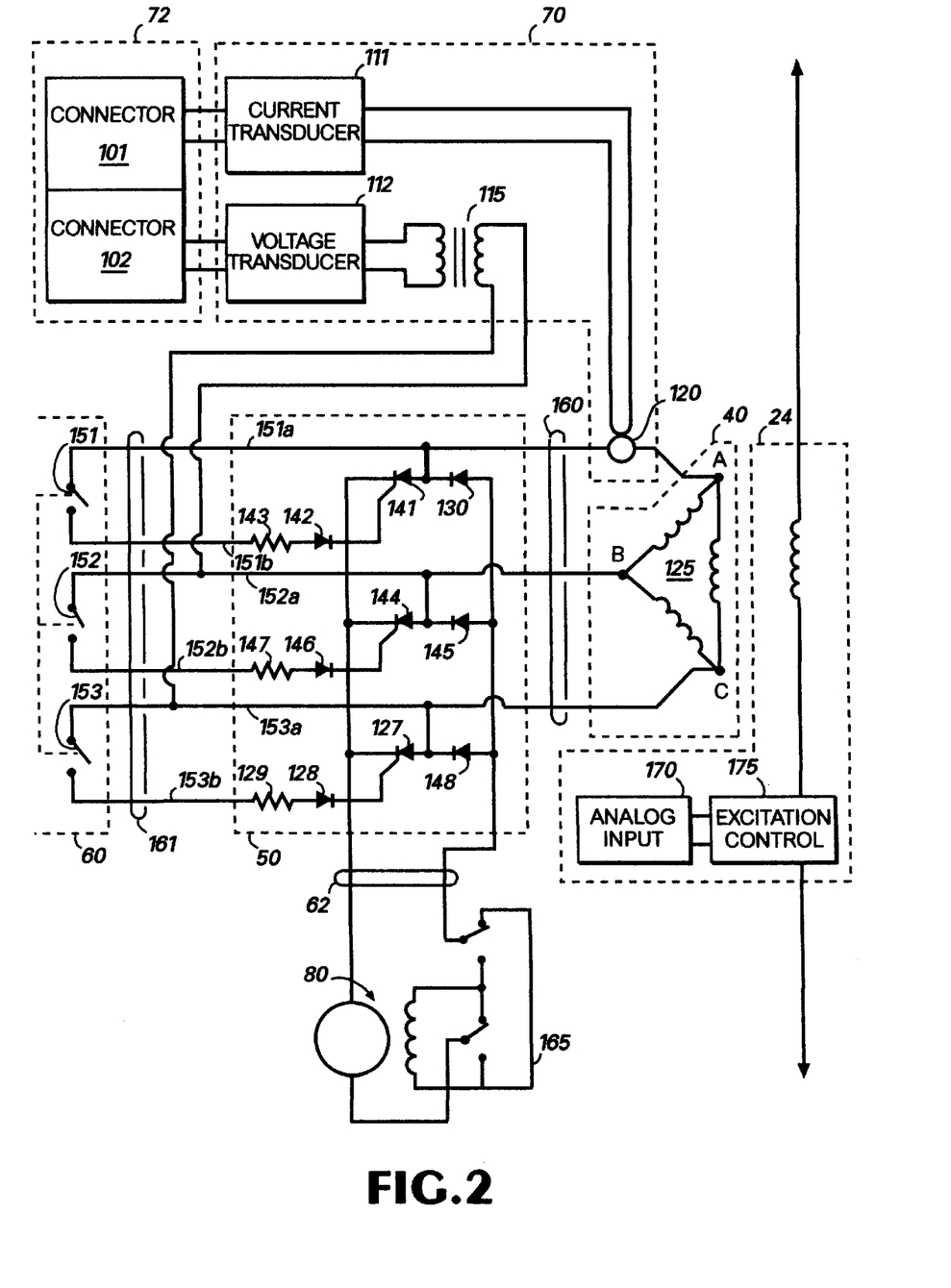
FIG. 2 is a schematic diagram of a portion of a traction control system constructed in accordance with an exemplary embodiment of the present invention.

FIG. 2 is a schematic diagram of a portion of a traction control system constructed in accordance with an exemplary embodiment of the present invention. For simplicity, only one rectifier assembly and traction motor pair is illustrated. In actuality, the traction motor system will contain several pairs of rectifier assemblies and traction motors. FIG. 2 illustrates details of the alternator 40, the rectifier 50, the traction adjustment device 60, and the adhesion loss detector 70. The alternator 40 includes alternator coils 125. The interface 24 to the alternator 40 includes an analog input 170, an excitation control 175, and an excitor field coil 180. Thus, the interface 24 (shown in FIG. 1) receives an analog control signal and an analog excitor signal from the controller 20 (shown in FIG. 1) at analog input 170. These signals are then passed to the excitation control 175. The excitation control 175, receives the control signal from the analog input 170 and operates as a gate for providing the analog excitor signal to the excitor field coil 180. In response to a first control signal received at analog input 170, the excitation control 175 prevents the analog excitor signal from being provided to the excitor field coil 180. In response to a second control signal received at point 170, the excitation control 175 permits the analog excitor signal to be provided to the excitor field coil 180. When the analog excitor signal is provided to the excitor field coil 180, an excitor field is generated. Various excitor signals can be provided at analog input 170 for generating excitor fields of varying intensities.

In an exemplary embodiment, the alternator 40 is a model 741 alternator manufactured by Marathon Electric. The alternator 40 is mechanically coupled to the diesel engine 30 (shown in FIG. 1) by means of a rotatable shaft. When the diesel engine 30 operates to rotate the shaft of the alternator 40, a three-phase alternating-current is produced across nodes A, B, and C of the alternator coils 125.

The rectifier assembly 50 operates to rectify the three phases of the alternating-current signal generated across the nodes of the alternator coils 125 to produce a DC signal. The rectifier assembly 50 includes an alternator interface 160, a traction adjustment device interface 161, and a traction motor interface 162. The alternator interface 160 includes three lines with one line being respectively connected to each of the nodes (A, B, and C) of the alternator coils 125. The traction adjustment device interface 161 includes three pairs of conductors. Each pair of conductors is connected across the terminals of a relay device located within the traction adjustment device 60. Conductor pair 151a and 151b are connected across the terminals of relay 151, conductor pair 152a and 152b are connected across the terminals of relay 152, and conductor pair 153a and 153b are connected across the terminals of relay 153. In addition, one of the conductors of each pair of conductors is electrically coupled to one of the lines of the alternator interface 160. Thus, conductor 151a is electrically coupled to node A of the alternator coils 125, conductor 152a is electrically coupled to node B of the alternator coils 125, and conductor 153a is electrically couple to node C of the alternator coils 125.

The rectifier assembly 50 rectifies each phase of the alternating-current signal. The rectifier assembly could be configured as either a full-wave rectifier or a half-wave rectifier. To generate the DC signal, the controller 20 interfaces with the traction adjustment device 60 over interface 26 (all shown in FIG. 1). In response to receiving a control signal at interface 26, the relays 151–153 are energized or forced into the closed position. When relays 151–153 are closed, the positive cycles of the three phases result in current flowing through the rectifier assembly 50.

The operation of the rectifier assembly can best be understood by examining one phase at a time. For purposes of discussion, assume that during the positive cycle of phase 1, a voltage is developed across nodes A and B of the alternator coils 125 with the potential at node A being more positive than the potential at node B. During the positive cycle of phase 2, a voltage is developed across nodes B and C of the alternator coils 125 with the potential at node B being more positive than the potential at node C. During the positive cycle of phase 3, a voltage is developed across nodes C and A of the alternator coils 125 with the potential at node C being more positive than the potential at node A.

During the positive portion of phase 1, current flows from node A of the alternator coils 125 through relay 151, a gate current limiting resistor 143, and diode 142, thereby generating a positive voltage at the gate of a silicon controller rectifier ("SCR") 141. This allows current to flow from node A, through the SCR 141, the traction motor 80, the reversing switch 165, diode 145, and back to node B of the alternator coils 125. Reversing switch 165 is used for reversing the flow of current through the series-wound coils of the traction motor 80 and reversing the direction of the motor.

During the positive portion of phase 2, current flows from node B of the alternator coils 125 through relay 152, a gate current limiting resistor 147, and diode 146, thereby generating a positive voltage at the gate of the SCR 144. This allows current to flow from node B, through the SCR 144, the traction motor 80, the reversing switch 165, diode 148, and back to node C of the alternator coils 125.

During the positive portion of phase 3, current flows from node C of the alternator coils 125 through relay 153, a gate current limiting resistor 129, and diode 128, thereby generating a positive voltage at the gate of the SCR 127. This allows current to flow from node C, through the SCR 127, the traction motor 80, the reversing switch 165, diode 130, and back to node A of the alternator coils 125.

The reader should understand that by changing the direction of rotation of the alternator coils 125, the current flow is also changed. In addition, in a three-phase system such at this, there is some overlap in the positive portions of the phases. Thus, the rectifier assembly 50 operates to combine overlapping portions of the phases.

During the negative cycles of each phase, the respective SCRs 141, 145, or 127 are open, thereby allowing the diodes to sink the current for the respective node.

As the traction motor 80 operates, the speed of the traction motor 80 is monitored through the adhesion loss detector 70 operating in conjunction with the controller 20 (shown in FIG. 1). This is accomplished by monitoring the current and the voltage generated by the alternator after an equilibrium state has been reached. The adhesion loss detector 70 includes a current monitor and a voltage monitor that are electrically coupled to the alternator coils 125. In the exemplary embodiment, the current monitor includes a current transformer 120 and a current transducer 111. The current transformer 120 detects the alternating-current flowing through node A of the alternator coils 125 and provides a detected alternating-current to the current transducer 111. In the preferred embodiment, this detected alternating-current is on the order of 0–5 amps. The current transducer 111 converts the detected alternating-current signal into a DC voltage. In the preferred embodiment, the DC voltage is on the order of 0–10 volts.

In the exemplary embodiment, the voltage monitor includes a voltage transformer 115 and a transducer 112. The voltage transformer 115 is electrically coupled across nodes B and C of the alternator coils 125 and provides an alternating-current voltage to the voltage transducer 112. In the preferred embodiment, the alternating-current voltage provided to the voltage transformer 115 is on the order of 0–300 VAC. The voltage transformer 115 steps the voltage down to 0–150 VAC. This signal is then provided to voltage transducer 112 which converts the signal into a DC voltage. In the preferred embodiment, the DC voltage is on the order of 0–10 volts.

The DC voltages from the voltage transducer 112 and the current transducer 111 are then provided to the controller 20 over interface 72. The controller 20 receives the DC voltages and determines the current speed of the traction motor 80. This determination can be made in several ways including calculating the speed based on the received voltages or using a look-up table.

When controller 20 determines that the speed of the traction motor 80 exceeds the trigger-off percentage of the threshold speed, wheel-slippage is assumed to be occurring. In response to the detection of wheel-slippage, the controller 20 (*a*) provides a control signal to the traction adjustment device 60, and (*b*) reduces the value of the excitor signal provided to analog input 170.

The control signal is provided by the controller 20 in order to turn off the traction motor 80. Thus, in response to receiving the control signal, the traction adjustment device 60 de-energizes the relays 151–153 forcing them into the open position. When the relays 151–153 are opened, the gates to the SCRs 141, 145, and 127 are also open, thereby turning them off. While the SCRs are off, no current is drawn from the alternator coils 125 by the rectifying assembly 50. Therefore, the current through the series wound coils of the traction motor 80 drops to zero and the speed of the traction motor 80 begins to taper off.

As the traction motor 80 decelerates, the traction motor 80 requires less current. The controller 20 reduces the value of the excitor signal to reduce the excitor field generated by excitor coil 180. When the excitor field decreases, the alternator 40 generates less current. Thus, the controller 20 can reduce the excitor signal to compensate for a decrease in power demand due to turning off the traction motor 80.

As a result of the SCR's in the rectifier assembly being turned off, the current at transformer 120 and the voltage at voltage transformer 115 drop to 0. This results in the DC voltages produced by the adhesion loss detection 70 dropping to 0 volts. After a predetermined delay, the controller 20 provides a signal to the traction adjustment device 60 to energize the relays 151–153. Energizing the relays 151–153 results in turning the SCRs 141, 145, and 127 back on allowing current to flow to the traction motor 80. The length of the predetermined delay is selected preferably to ensure that the traction motor 80 is off long enough to stop the wheels from slipping. In the preferred embodiment, this is on the order of one second. In other embodiments, rather than using a delay, the speed of the traction motor may be monitored. When the speed of the traction motors drops within a predetermined range of the threshold speed, the traction motor can be turned on again.

Figure 3:
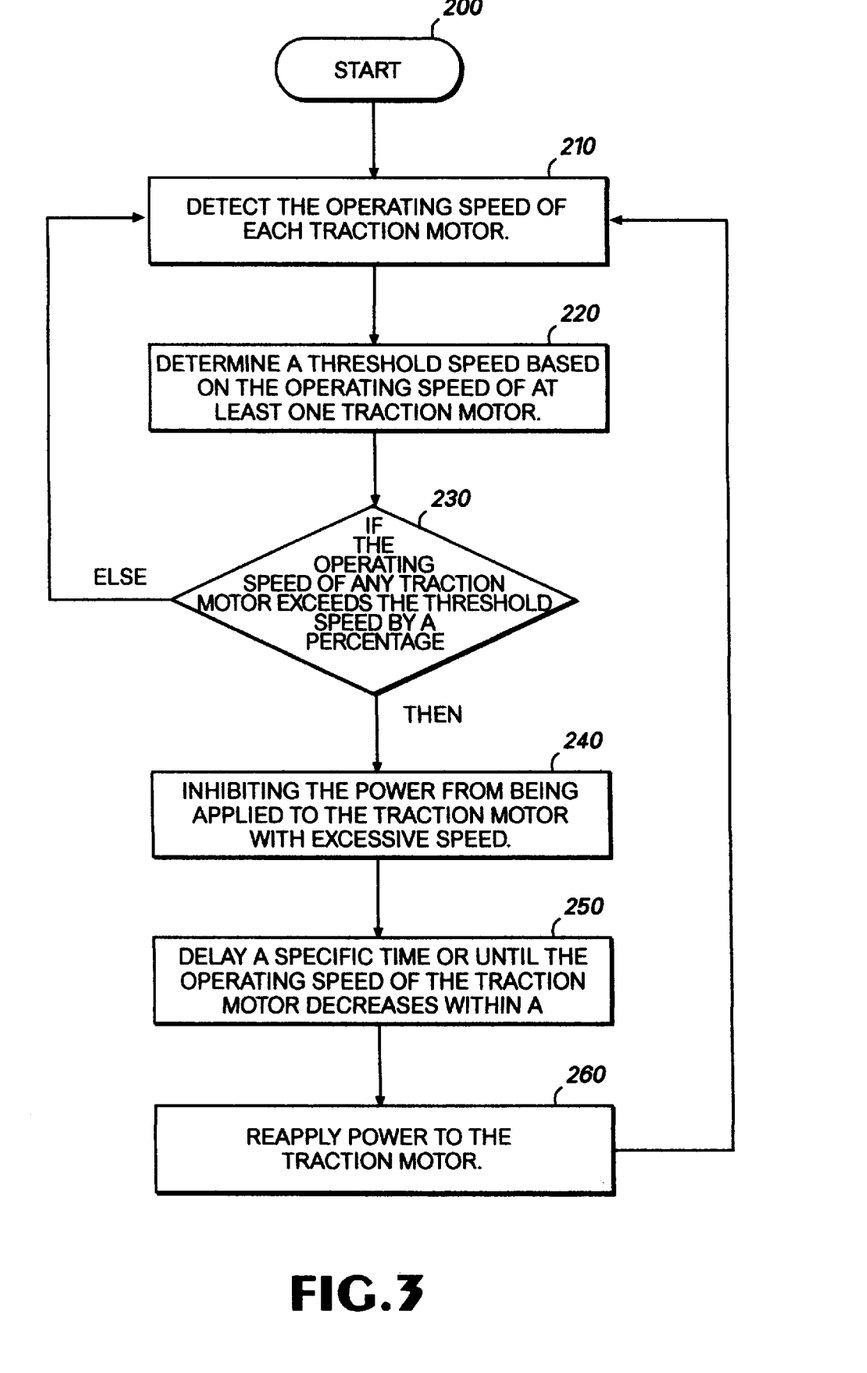
FIG. 3 is a flow diagram illustrating a method for providing traction control to remedy wheel-slippage.

The present invention also provides an exemplary method for remedying wheel-slippage. FIG. 3 is a flow diagram illustrating a method for providing traction control to remedy wheel-slippage. The process begins at step 200. At step 210, the operating speed of each of the traction motors is detected. At step 220 a threshold speed is determined based on the operating speed of at least one of the traction motors. At step 230, the operating speed of each of the traction motors is compared to the threshold speed. If the operating speed of one or more of the traction motors exceeds the threshold speed by a percentage, then wheel-slippage is occurring. Upon detecting wheel-slippage, processing continues at step 240. Otherwise, if no wheel-slippage is detected, processing returns to step 210 and the operating speed of each of the traction motors is again detected. At step 240, the power is inhibited from being provided to each of the traction motors having an operating speed that exceeds the threshold speed by a percentage. At step 250, processing is delayed a specific amount of time to allow the wheel-slippage to stop, or the operating speed of the traction motor is monitored to detect a decrease in the operating speed to within a range of the threshold speed. After the delay, processing continues at step 260. At step 260, the power is reapplied to the traction motors. Processing then returns to step 210 to detect the operating speed of each of the traction motors. This process is repeated during the operation of the locomotive.

CONCLUSION

From the foregoing description, it will be appreciated that the present invention provides a system and a method for remedying wheel-slippage in railroad locomotives while maintaining acceleration power. An exemplary embodiment of the present invention monitors the speed of each of the traction motors used to drive the wheels of the locomotive. If the speed of a particular traction motors exceeds a threshold speed (the threshold speed being based on the speed of at least one of the traction motors) by a specific percentage, the wheels of the locomotive driven by that particular traction motor are considered to be slipping. The wheel-slippage is remedied by briefly interrupting the supply of power to that particular traction motor. Thus, the present invention allows each of the traction motors of a locomotive to be independently controlled. This technique allows wheel-slippage to be corrected without reducing the motive power applied to non-slipping wheels, thereby maintaining maximum acceleration power.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is described by the appended claims and supported by the foregoing description.

I claim:

1. A traction control system for remedying wheel-slippage included by at least one of a plurality of traction motors, each of the plurality of traction motors being independently coupled to and driving at least one wheel, comprising:

a controller being operative to selectively provide a power signal to any of the plurality of traction motors;

a monitoring system, coupled to each of the plurality of traction motors and to the controller, for detecting an increase in an operating speed, beyond a slipping speed, of any one of the plurality of traction motors, and being operative to provide to the controller an identity of a traction motor associated with the increase, wherein the controller and the monitoring system are operative to establish a threshold speed by:

the monitoring system detecting the operating speed of each of the plurality of traction motors and notifying the controller of the operating speed of each of the plurality of traction motors; and the controller equating the threshold speed to a value based on the operating speed of at least one of the plurality of traction motors; and in response to receiving the identity of the traction motor associated with the increase, the controller being operative to inhibit the power signal from being provided to the traction motor associated with the increase, whereby the wheel-slippage induced by the traction motor associated with the increase in the operating speed beyond the slipping speed is remedied.

2. The traction control system of claim 1, wherein the controller is further operative, after inhibiting the power signal, to again provide the power signal to the traction motor associated with the increase after a period of time.

3. The traction control system of claim 1, wherein the controller is further operative, after inhibiting the power signal, to again provide the power signal to the traction motor associated with the increase after the monitoring system detects a decrease in the operating speed of the traction motor substantially to the threshold speed.

4. A method for remedying wheel-slippage induced by at least one of a plurality of traction motors, each of the plurality of traction motors being independently coupled to and driving at least one wheel, comprising the steps of:
  detecting an operating speed for each of the plurality of traction motors, wherein the step of detecting the operating speed for each of the plurality of traction motors results in a plurality of operating speeds;
  determining a threshold speed based on the operating speed of at least one of the plurality of traction motors, wherein the step of determining a threshold speed comprises the steps of:
    identifying a slowest speed of the plurality of operating speeds; and
    equating the threshold speed to the slowest speed;
  comparing the operating speed of each of the plurality of traction motors to the threshold speed; and
  in response to determining that a particular operating speed of a particular traction motor of the plurality of traction motors exceeds the threshold speed by a percentage, inhibiting a power signal from being applied to the particular traction motor.

5. A method for remedying wheel-slippage induced by at least one of a plurality of traction motors, each of the plurality of traction motors being independently coupled to and driving at least one wheel, comprising the steps of:
  detecting an operating speed of each of the plurality of traction motors;
  determining a threshold speed based on the operating speed of at least one of the plurality of traction motors;
  comparing the operating speed of each of the plurality of traction motors to the threshold speed;
  in response to determining that a particular operating speed of a particular traction motor exceeds the threshold speed by a percentage, inhibiting power from being applied to the particular traction motor; and
  in response to determining that the particular operating speed of the particular traction motor is within a predetermined range of the threshold speed, reapplying the power to the particular traction motor.

6. A method for remedying wheel-slippage included by at least one of a plurality of traction motors, each of the plurality of traction motors being independently coupled to and driving at least one wheel, comprising the steps of:
  determining that an operating speed of a particular traction motor of the plurality of traction motors exceeds a threshold speed by a predetermined percentage;
  inhibiting power from being applied to the particular traction motor;
  determining that the operating speed of the particular traction motor is within a range of the threshold speed; and
  reapplying the power to the particular traction motor.

7. A traction control system for remedying wheel-slippage included by at least one of a plurality of traction motors, each of the plurality of traction motors being independently coupled to and driving at least one wheel, comprising:
  a controller being operative to selectively provide a power signal to any of the plurality of traction motors;
  a monitoring system, coupled to each of the plurality of traction motors and to the controller, for detecting an increase in an operating speed, beyond a slipping speed, of any one of the plurality of traction motors, and being operative to provide to the controller an identity of a traction motor associated with the increase, wherein the slipping speed is substantially equated to the sum of a threshold speed and an offset speed; and
  in response to receiving the identity of the traction motor associated with the increase, the controller being operative to inhibit the power signal from being provided to the traction motor associated with the increase, whereby the wheel-slippage induced by the traction motor associated with the increase in the operating speed beyond the slipping speed is remedied.

8. The traction control system of claim 7, wherein the offset speed is a percentage of the threshold speed, whereby the offset speed varies substantially in proportion to the threshold speed.

9. A traction control system for remedying wheel-slippage included by at least one of a plurality of traction motors, each of the plurality of traction motors being independently coupled to and driving at least one wheel, comprising:
  a controller being operative to selectively provide a power signal to any of the plurality of traction motors;
  a monitoring system, coupled to each of the plurality of traction motors and to the controller, for detecting an increase in an operating speed, beyond a slipping speed, of any one of the plurality of traction motors, and being operative to provide to the controller an identity of a traction motor associated with the increase, the controller and the monitoring system operative to establish a threshold speed; and
  in response to receiving the identity of the traction motor associated with the increase, the controller being operative to inhibit the power signal from being provided to the traction motor associated with the increase, whereby the wheel-slippage induced by the traction motor associated with the increase in the operating speed beyond the slipping speed is remedied, and wherein the controller is further operative, after inhibiting the power signal, to again provide the power signal to the traction motor associated with the increase after the monitoring system detects a decrease in the operating speed of the traction motor substantially to the threshold speed.

10. A traction control system for remedying wheel-slippage included by at least one of a plurality of traction motors, each of the plurality of traction motors being independently coupled to and driving at least one wheel, comprising:
  a controller being operative to selectively provide a power signal to any of the plurality of traction motors;
  a monitoring system, coupled to each of the plurality of traction motors and to the controller, for detecting an increase in an operating speed, beyond a slipping speed, of any one of the plurality of traction motors, and being operative to provide to the controller an identity of a traction motor associated with the increase by providing a wheel-slippage indicator;

in response to receiving the identity of the traction motor associated with the increase, the controller being operative to inhibit the power signal from being provided to the traction motor associated with the increase, whereby the wheel-slippage induced by the traction motor associated with the increase in the operating speed beyond the slipping speed is remedied; and the controller further comprising a switching device with a control input, the switching device of the controller being operative:
- to receive the wheel-slippage indicator at the control input;
- to inhibit the power signal from being provided to the traction motor associated with the increase in response to receipt of the wheel-slippage indicator;
- to detect an absence of the wheel-slippage indicator at the control input after inhibiting the power signal; and
- to provide the power signal to the traction motor associated with the increase in response to detecting the absence of the wheel-slippage indicator.

11. A traction control system for remedying wheel-slippage included by at least one of a plurality of traction motors, each of the plurality of traction motors being independently coupled to and driving at least one wheel, comprising:

a controller being operative to selectively provide a power signal to any of the plurality of traction motors, the controller comprising:
a plurality of rectifier assemblies, each of the plurality of rectifier assemblies being coupled to a respective one of the plurality of traction motors at a first interface, and each of the plurality of rectifier assemblies being operative:
- to receive an alternating-current signal at a second interface, wherein the alternating-current signal is a three-phase alternating-current signal received from an alternator;
- to convert the alternating-current signal into a power signal compatible with the respective transaction motor, wherein the power signal is a DC signal generated by rectifying each phase of the alternating-current signal; and
- to provide the power signal to the transaction motor over the first interface;

a monitoring system, coupled to each of the plurality of traction motors and to the controller, for detecting an increase in an operating speed, beyond a slipping speed, of any one of the plurality of traction motors, and being operative to provide to the controller an identity of a traction motor associated with the increase; and in response to receiving the identity of the traction motor associated with the increase, the controller being operative to inhibit the power signal from being provided to the traction motor associated with the increase, whereby the wheel-slippage induced by the traction motor associated with the increase in the operating speed beyond the slipping speed is remedied.

12. The traction control system of claim 11, wherein each of the plurality of rectifier assemblies is a half-wave rectifier.

13. The traction control system of claim 11, wherein each of the plurality of rectifier assemblies is a full-wave rectifier.

14. A traction control system for remedying wheel-slippage included by at least one of a plurality of traction motors, each of the plurality of traction motors being independently coupled to and driving at least one wheel, comprising:

a controller being operative to selectively provide a power signal to any of the plurality of traction motors;

a monitoring system, coupled to each of the plurality of traction motors and to the controller, for detecting an increase in an operating speed, beyond a slipping speed, of any one of the plurality of traction motors, and being operative to provide to the controller an identity of a traction motor associated with the increase, the monitoring system comprising:
a load detection means for measuring a present load that a particular traction motor of the plurality of traction motors places on the power signal;
a conversion means for converting the present load into a speed-signal substantially proportional to a particular operating speed of the particular traction motor; and
a comparison means for comparing the speed-signal to the slipping speed and providing to the controller, an identity of the particular traction motor if the speed-signal exceeds the slipping speed; and in response to receiving the identity of the traction motor associated with the increase, the controller being operative to inhibit the power signal from being provided to the traction motor associated with the increase, whereby the wheel-slippage induced by the traction motor associated with the increase in the operating speed beyond the slipping speed is remedied.

15. The traction control system of claim 14, wherein the comparison means is operative to provide the identity of the particular traction motor by providing a wheel-slippage indicator; and wherein the comparison means is operative to inhibit the wheel-slippage indicator for the particular traction motor upon detecting that the speed-signal of the particular traction motor is within a range of a threshold speed.

16. A method for remedying wheel-slippage induced by at least one of a plurality of traction motors, each of the plurality of traction motors being independently coupled to and driving at least one wheel, comprising the steps of:

detecting an operating speed of each of the plurality of traction motors;

determining a threshold speed based on the operating speed of at least one of the plurality of traction motors;

inhibiting power from being applied to a particular traction motor;

determining that a particular operating speed of the particular traction motor is within a predetermined range of the threshold speed; and reapplying the power to the particular traction motor.

* * * * *